(12) United States Patent
Bentley et al.

(10) Patent No.: US 7,194,489 B2
(45) Date of Patent: Mar. 20, 2007

(54) SYSTEM, METHOD AND COMPUTER PROGRAM PRODUCT FOR COLLABORATIVE ENGINEERING USING COMPONENT AND FILE ORIENTED TOOLS

(75) Inventors: Keith Bentley, Elverson, PA (US); Barry Bentley, Elverson, PA (US); Raymond Bentley, Elverson, PA (US); John Gooding, Spring City, PA (US); Sam Wilson, Downingtown, PA (US)

(73) Assignee: Bentley Systems Incorporated, Exton, PA (US)

( * ) Notice: Subject to any disclaimer, the term of this patent is extended or adjusted under 35 U.S.C. 154(b) by 398 days.

(21) Appl. No.: 09/982,753

(22) Filed: Oct. 22, 2001

(65) Prior Publication Data
US 2002/0029218 A1    Mar. 7, 2002

Related U.S. Application Data

(63) Continuation-in-part of application No. 09/296,738, filed on Apr. 22, 1999, now Pat. No. 6,341,291.

(60) Provisional application No. 60/102,118, filed on Sep. 28, 1998.

(51) Int. Cl.
*G06F 17/30* (2006.01)

(52) U.S. Cl. .................. 707/203; 707/1; 707/200; 717/170

(58) Field of Classification Search ........ 707/200–206, 707/1–10, 100–104.1; 703/4, 22; 700/95, 700/96, 106; 715/511; 717/170, 122
See application file for complete search history.

(56) References Cited

U.S. PATENT DOCUMENTS 4,714,992 A * 12/1987 Gladney et al. ............ 707/206

5,339,247 A * 8/1994 Kirihara et al. ............ 700/106
5,551,028 A * 8/1996 Voll et al. ............... 707/103 R
5,815,415 A * 9/1998 Bentley et al. ................ 703/4

(Continued)

*Primary Examiner*—John E. Breene
*Assistant Examiner*—Jean Bolte Fleurantin
(74) *Attorney, Agent, or Firm*—Venable LLP; Caroline J. Swindell

(57) ABSTRACT

Conventional file-based engineering design data for an engineering model are represented by a plurality of components. The plurality of components are kept in stores, which reside on servers. Each store contains the components that correspond to the elements of one design file. The stores also maintain a history of changes made to the components. A plurality of client computers are bidirectionally connected to the servers. Each client computer may obtain the current version of the components and may send locally edited versions of the components back to the servers to replace the current versions in the stores. At the client computer, the user interacts with the components using conventional file-based software. Before the locally edited versions of the components are committed to the servers to replace the current versions, a synchronization and merging process occurs whereby the latest version of the components are downloaded to the client computer and are compared to the locally edited version of the components to detect resolvable (compatible) and unresolvable (incompatible) conflicts. The commit process is performed only if no unresolvable conflicts exist between the two versions of the components. To facilitate translation between file-based data and components, a schema is written to "wrap" each of the engineering file formats. Each schema is a set of classes that capture all of the information in the file-based data.

18 Claims, 5 Drawing Sheets

U.S. PATENT DOCUMENTS 5,878,408 A * 3/1999 Van Huben et al. ............ 707/1
5,884,322 A * 3/1999 Sidhu et al. ................ 707/200
5,950,201 A * 9/1999 Van Huben et al. .......... 707/10
5,987,242 A * 11/1999 Bentley et al. ................ 703/13
6,088,693 A * 7/2000 Van Huben et al. ............ 707/8

* cited by examiner

SYSTEM, METHOD AND COMPUTER PROGRAM PRODUCT FOR COLLABORATIVE ENGINEERING USING COMPONENT AND FILE ORIENTED TOOLS

CROSS-REFERENCE TO RELATED APPLICATION

The present application is a continuation-in-part of U.S. patent application Ser. No. 09/296,738 filed Apr. 22, 1999, entitled "System for Collaborative Engineering Using Component and File Oriented Tools" of common assignee to the present invention, which claims the benefit of U.S. Provisional Application No. 60/102,118, filed Sep. 28, 1998 entitled "ProjectBank—A Technology for Enabling Collaborative Engineering with Component and File-Oriented Tools", the contents of both are incorporated herein by reference in their entirety.

BACKGROUND OF THE INVENTION

1. Field of the Invention

The present invention relates to a system for storing, managing and tracking changes to design information typically created in multi-user, multi-discipline, engineering projects. Specifically, the present invention provides a management tool for tracking and managing multiple simultaneous changes to a project data set in a cohesive, secure, identifiable, and reversible way. Importantly, the invention provides interfaces for importing data from, and for making changes to, the project data set with file-oriented tools such as CAD programs.

2. Related Art

The goal of concurrent engineering is to enable multiple users to work on the same design concurrently, each contributing his own expertise in a way that builds on and complements the work of others. Engineering projects present a particularly challenging computer information management problem since they are characterized by workflows that involve multiple participants simultaneously making changes to related information. Current generation software products, particularly those in the computer aided drafting (CAD) category, are weak at supporting these workflows, since they were generally designed to replicate and automate the one-at-a-time nature of drafting boards.

In pre-CAD workflows, a paper drawing could only be modified by a single draftsperson at a time. Thus, it seemed natural that the computerized equivalents would take the same approach. However, that approach is now seen as inadequate. First, the manual process on which the software design is based has limitations and problems. For example, coordination between draftspeople requires verbal communication between the draftspeople, which is subject to a breakdown. Second, the 'ubiquitous' nature of electronic information access tends to exacerbate the weaknesses of the manual communications process. Participants on an electronic project can now be physically dispersed as a byproduct of the 'virtual office' model made possible by communications advances such as the Internet. Third, software advances are making electronic engineering simulations more powerful and reliable such that the computer model can be regarded as the master design information, with design drawings representing reports generated from that model.

Limitations of the File-Oriented Approach to Design Data Management

To simplify the data management task, most engineering design tools store each model in its own physical file. The main drawback of this approach, in a multi-user setting, is that it imposes a fixed limit on how users can collaborate on a project. By mapping the design concept of a model to the operating system concept of a file, these tools impose file system concepts and limitations on the structure and flow of design work. This is a bad fit in several respects.

File-oriented tools commonly do file-level locking, which permits only one user to modify anything pertaining to a given model at a given time. In engineering design work, a change to an existing design or the further development of a design can commonly take several days and involve a number of smaller steps. In some cases, changes may affect large parts of the project. A single engineer may therefore keep a given set of design files locked and out of circulation for long periods of time, blocking the progress of other users whose changes may require write access to one or more of those files. Clearly, the coarse-grained, file-oriented approach becomes a bottleneck to teamwork. Equally clearly, even if the unit of information sharing and change-control could be broken down, it would be inappropriate to apply traditional multi-user transaction concurrency rules, which assume relatively quick, isolated changes.

The file-oriented approach also does not address the problem of how to merge the collaborative work of many users on many files into a coherent change to the project. By limiting concurrency, the file-oriented approach does simplify the problem somewhat (assuming that file sharing is used correctly to prevent collisions and loss of work in the first place). However, when change is limited to one-at-a-time access to files, there is no chance to express and maintain the interdependencies that exist between files, since it could potentially require that all files be locked in order to make a change to any one. Therefore, the file-oriented approach is to permit these inconsistencies, and require manual inspection by a "higher power" (usually an individual responsible for "project management") to rectify them. In most cases, merging is done "by eye" during sign-off. It would be beneficial if "business logic" that enforces standards and design constraints could be integrated into the editing process. The need for automatic methods of verification becomes greater as concurrency is increased.

The merge problem is one aspect of the general problem of documenting, managing, limiting, and potentially reversing the evolution of a design, which is made more complicated when multiple designers are working on it at the same time. Another aspect of this problem is keeping an infallible log of changes, so that they can be subsequently reviewed when questions arise. If the unit of change is per-file, then change documentation is harder to do in a sufficiently detailed fashion, and harder to integrate into the editing process itself to guarantee an accurate and useful audit trail. Add-on products such as workflow managers and product data managers (PDM) do not address this problem of granularity.

Despite these limitations, traditional file-oriented programs such as MicroStation are very efficient viewing and editing tools and are well known by many users, so there is strong incentive to continue using them.

Interoperability of Heterogeneous Tools

A single engineering design team will sometimes use different design tools, each operating on its own design format, in a single project. Or, one engineer may receive a design in one format but need to use an editing tool that reads a different format in order to review or change it. The so-called "file-conversion" problem requires that engineering data modeled in the format of one tool be converted to the format of a different tool. Since different tools and formats have unique features, this conversion cannot always be exact, and a "round trip" will sometimes alter the design in subtle, unintended ways. The translation mismatch between heterogeneous tools has long been a substantial limitation to integration between design groups within large enterprises and between separate ones.

Existing Solutions

Various products have been developed to transcend the file-oriented model, while still allowing traditional tools to be applied at the viewing and editing stage. One common approach, for example, in ModelServer Continuum™, is to store all elements of all models together in a single relational database and to produce temporary design files from the database in order to conduct a viewing or editing session. In addition to providing for better management of shared information, this approach has the benefit of making engineering data more accessible to enterprise applications. The main drawbacks to this approach are that (a) it requires mapping engineering design data into database management system (DBMS) constructs, which is not always easy, (b) it requires a separate database management product to be purchased, installed, and administered, and (c) extraction is done once and for all at the start of the session (i.e., everything for the session must be extracted "up-front"). Some of these products, such as Continuum™, do address the need for a new concurrency model, but are limited by the capabilities of the underlying database management system.

The problem of mapping engineering data into a database format is severe, since the data models of engineering and DBMS tools were developed independently with different goals. It would be a major benefit to avoid the translation problem without losing the interoperability benefits of this approach.

Accordingly, the software model of storing engineering projects as a disconnected series of "drawing files" must be updated to advance the state-of-the-art. Heretofore, no product known to the inventors, aside from the present invention and the invention of the above-referenced application, uses a component-oriented approach to enable more effective collaborative use of traditional file-oriented engineering design tools. The present invention fulfills such a need.

SUMMARY OF THE INVENTION

In an exemplary embodiment of the present invention a system, method and computer program product for collaborative engineering using component and file oriented tools is disclosed.

All of the design elements that correspond to one design file can be stored in their own separate repository, or "store". This allows the data for a design project to be distributed on several different servers and machines, if necessary. Servers containing project data can therefore be configured in various relationships, such as cluster or hierarchies. Additionally, servers and machines used in a project can be scaled up when the project grows or re-distributed when network needs change.

Each store 'knows' with which server it is associated. A client program knows which stores it needs, and can therefore collect all needed data for a project by accessing the stores, without having to know which particular servers to access ahead of time. Stores can therefore be moved to different servers in a way that is completely transparent to the users and the client programs.

The present invention can be integrated with existing component and file oriented tools and not be a stand-alone system. This existing user validation and file access services to be used.

An exemplary embodiment of the present invention can include a method of managing file-based data, which is manipulated by at least one user via a file-based computerized editor, where the file-based data includes a plurality of file elements, which includes representing file-based data as individual components. Each individual component can have a unique identity and identifier. The individual components can be stored in a store.

In an exemplary embodiment, the method can further include storing all of the individual components corresponding to one file of the file-based data in a single store, where the single store contains no individual components from any other file of the file-based data.

The method can further include retrieving the components using a client program, which has a private store and a run-time agent. The client's run-time agent looks up a store's server. Using the server information from the store, the run-time agent connects with the store's server, requests the components from the server, and stores a version of the components in the private store. The client can also provide access to the retrieved components to external applications through the run-time agent.

In an exemplary embodiment, the method can further include recreating equivalent file-based data for use within an environment of a file-based computerized editor from the individual components in the store. The method can also include editing the recreated file-based data with a file-based editor in multiple successive sessions, storing the latest version of the individual components, and storing information to fully document changes made to each version of each individual component during each of the editing sessions, where the changes can include additions, modifications and deletions.

In an exemplary embodiment, the method can further include using the change information stored to view successive versions of any individual changed component or to view a plurality of changed components.

The method can further include defining and storing a schema for the plurality of components, where the schema is a set of classes that captures all of the information in the file-based data, and retrieving the schema whenever the components are retrieved from the store. The schema of the method can define a class for each element type, or a plurality of classes for the file-based data. The schema can be associated with a DGN file, a DWG file, or a standard for the exchange of product model (STEP) file.

In an exemplary embodiment, each component can have a unique identifier, a set of fields, each field having a data type and a data value, and a program which interprets and modifies the fields, and each of these items can be stored for each component. Some of the components can also have a list of other dependent components or an access control value, and such components or access control values can also be stored.

The method can further include mapping at least some of the of file-based elements to respective single components. The method can also further include defining a tag for at least some of the file elements during interaction with the computerized editor, and storing and saving a mapping between the tag for each tagged file element and its component identifier.

In another exemplary embodiment, a data management structure for engineering design data is provided. The data management structure can store a plurality of components, where each component has a unique identifier, a set of fields, each field having a data type and a data value, and a program which interprets and modifies the fields, where at least some of the components represent respective elements in a file-based computerized editing system.

The components of the data management structure can also include a list of other dependent components, or an access control value. In an exemplary embodiment of the present invention, a user can manipulate the elements in multiple editing sessions using a file-based editing program or a component-based computerized modeling system, where the plurality of components can include plural, successively changed versions of at least some of the individual components, each version representing a state of an associated changed element after the editing sessions, each of the versions being stored in a store.

In another exemplary embodiment, a store for storing a plurality of engineering models is provided. Each engineering model includes engineering design data, and a specific plurality of components. Each component kept in the store can have a unique identifier, a set of fields, where each field has a data type and a data value, and a program, which interprets and modifies the fields. At least some of the components can represent respective elements in a file-based computerized editing system.

In another exemplary embodiment, an apparatus for translating file-based data that is manipulated by at least one user via a file-based computerized editor into a plurality of individual components is provided. The file-based data can include a plurality of file elements. The apparatus can include a translation means for representing the file-based data as a plurality of individual components, where each individual component has a unique identifier, a set of fields, each field having a data type and a data value, a program which interprets and modifies the fields, and a memory for storing the individual components in a store.

Additionally, the apparatus may include components that also have a list of other dependent components or an access control value, and the memory in the components can store such lists and values. Each element in the file-based data can be represented by a component in the apparatus.

In another embodiment, an apparatus for translating a plurality of individual components, which are stored in a store, into file-based data is provided. Each individual component can have a unique identifier, a set of fields, where each field has a data type and a data value, and a program that interprets and modifies the fields. The apparatus can include a translator for representing the components as file-based data, the file-based data including a plurality of file elements, and a display for displaying the file-based data in a file-based computerized editor to allow for manipulation by a user in the file-based format.

The apparatus can further include individual components that also have a list of other dependent components, or an access control value. The components in the apparatus can represent elements.

In another exemplary embodiment, a client-server system for multi-user management of engineering data is provided. The system comprises a server that includes a store for storing a current version of a plurality of components. The components represent elements of at least one engineering project. Each component has a unique identifier, a set of fields, each field having a data type and a data value, and a program that interprets and modifies the fields. The system also includes a plurality of client computers. Each client computer is bidirectionally connected to the server for receiving the current version of a plurality of components representing a subset of elements of an engineering project, and for sending locally edited versions of the components back to the server. Each client computer may also include a component memory for storing the local version of the components.

Additionally, the components in the component memory of each client computer may be locally edited in successive editing sessions, and the component memory can store the latest version of the plurality of individual components, and information to fully document changes made to each version of each individual component during the local editing.

In this exemplary embodiment, each client computer in the system can include means for allowing locally edited versions of the components to replace the latest current version of the components in the server's store only if no unresolved component conflicts exist between the two versions.

Additionally, each client computer can include means for updating the latest locally edited version of the components to reflect any component changes made in the store since the client computer originally received the components from a server's store a result of component changes made by other client computers in the time period subsequent to the original receipt. The means for updating can include means for requesting and receiving the latest version of the components from the store's server, means for locally detecting resolvable and unresolvable component conflicts during the updating on a per component basis between the latest locally edited version of the components and the latest version of the components from the server's store, and means for replacing locally edited versions of the components which have no conflict or no unresolvable conflict with a latest version of the components from the server's store.

In an exemplary embodiment, the server of the system can store a plurality of engineering projects and each client computer can receive, send and store the plurality of engineering projects. Additionally, the server can include a plurality of stores for storing a current version of a plurality of components, the components representing elements of at least one engineering project; wherein each store stores the components corresponding to one design file; and wherein each component has a unique identifier, a set of fields, each field having a data type and a data value, and a program which interprets and modifies the fields.

The server can further include a globally unique ID, a port number and an Internet address. The client computer can further include a run-time agent for looking up a store's server with the server's Internet address and port number, connecting to the store's server, requesting the store's stored components and storing local versions of the components in the component memory.

The client-server system embodiment can further include a plurality of servers including a plurality of stores for storing a current version of the plurality of components. The client computers of the client-server system can be bidirectionally connected to the plurality of servers for receiving the current version of the plurality of components, and for sending locally edited versions of the components back to the plurality of servers.

In another exemplary embodiment, the present invention can be a computer program product embodied on a computer readable medium. The computer program product can include program logic, which can include translation program code means for representing file-based data as a plurality of individual components, each individual component having a unique identity and identifier. In addition, the program logic can include storing program code means for storing the individual components in a store; retrieval program code means for retrieving the components using a client comprising a private store, and a run-time agent, wherein the run-time agent looks up a store's server, connects with the store's server, requests the components from the server and stores a version of the components in the private store; run-time agent sharing program means for providing access to the retrieved components to external applications; file-based data recreation program code means for recreating equivalent file-based data for use within an environment of a file-based computerized editor from individual components in the store.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF AN EXEMPLARY EMBODIMENT OF THE PRESENT INVENTION

Figure 1:
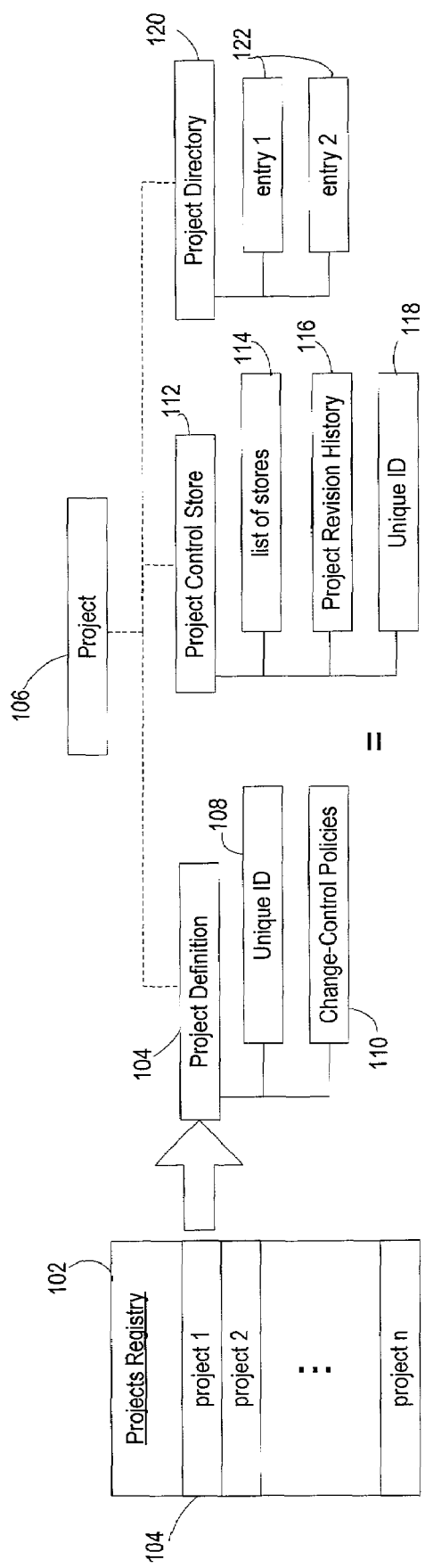
FIG. 1 depicts an exemplary embodiment of a project according to the present invention.

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

Certain terminology is used herein for convenience only and is not to be taken as a limitation on the present invention. In the drawings, the same reference letters are employed for designating the same elements throughout the several figures.

The present invention subdivides engineering project information into smaller units than drawings so that a more granular unit-of-interchange is presented to project participants. These smaller units are called "components," which are comprised of data values, data types, programs that manage the data, and connections to other components. The technology is named "ProjectBank™" (hereafter, "ProjectBank") and is referred to by that name throughout the specification. The component granularity of ProjectBank more accurately reflects the reality of the "interconnectedness" of design workflows compared to conventional file-based systems. Importantly, ProjectBank defines a transaction-based approach to allowing modifications to components that facilitates truly collaborative workflows, even by disjoint project teams. Conventional file-based systems lack such a capability.

Of course, investment in current technologies is very high and substantial changes to them will be expensive and slowly adopted. Any new software approach must be considered in the context of today's systems and upward compatibility is a paramount concern. The present invention combines the ProjectBank technology with file-oriented engineering software programs (such as CAD programs) and their corresponding data-files, without modifying the programs. This approach greatly increases the level of collaboration possible with existing tools without requiring substantial changes to existing workflows.

Definitions

COMPONENT—smallest unit of interchange in the system. A single component has a set of data values associated with it. If these values were all that defined a component, it would be commonly referred to in the literature as an "object." However, components differ from objects in that components also have a set of names and data types that define each data value (collectively, a "field"), a program that can interpret and modify the fields (a "class"), and, optionally, a list of other "dependent components." The definition of a component includes each of these concepts, and they must be considered inseparable from one another such that it must never be possible to encounter one without the others (although components of the same type can share a class).

The concept of a "component" was first introduced in U.S. Pat. No. 5,815,415 (Bentley et al.) which is incorporated by reference herein. However, this patent had no discussion of how components may be used for collaborative engineering.

SCHEMA—a collection of related classes that address a particular problem space.

JMDL—a programming language for creating schemas.

STORE—a database-like structure that contains all of the information, i.e. the objects, for a single persistent model corresponding to a design file. Stores are discussed in more detail below.

COMPONENT DATABANK (CDB)—a repository for components. Components each have an identity that is guaranteed to be unique with respect to all other components in the same Databank. To satisfy the definition of a component above, a Component Databank must store not only the data values of components, but also the schemas and dependent lists for each component. Information contained in an engineering project is captured in one or more CDBs. This collection of CDBs is called the ProjectBank for a particular project. The CDB may alternatively be referred to as the "component memory" or "component memory bank."

DESIGN FILE—a predefined data file created and edited by file-oriented CAD tools such as MicroStation® (hereafter, "MicroStation") and AutoCAD® (hereafter, "AutoCAD").

A MicroStation Design File is frequently referred to as a DGN file, and an AutoCAD Design File is frequently referred to as a DWG file.

BRIEFCASE—a file in a user or client computer which stores a local copy of a subset of the components in the CDB for a particular project. Briefcases are discussed in more detail below.

ProjectBank Overview

ProjectBank allows a team of engineers to collaborate on a project, using familiar editing tools but with fewer restrictions than was previously possible. ProjectBank allows designers to use file-oriented tools while also allowing concurrency at the component level. ProjectBank also creates a context in which existing file-oriented tools become forward compatible with new tools that may be developed. ProjectBank achieves these improvements without requiring engineering data to be mapped into a foreign database format.

ProjectBank and Wrapping Schemes

The ProjectBank becomes the permanent repository for project information. The design files are temporary, as explained below. Special intermediary software reads and writes the information in the ProjectBank under long-transaction control on behalf of file-oriented editing tools.

To enable ProjectBank control of a project, a schema is written to "wrap" each of the engineering file formats used by the existing tools. Wrapping a file format means defining a set of classes that capture exactly the information that can be stored in such a file, so that the contents of any file using that format can be represented as a collection of components in the wrapping schema. For example, a DGN schema would be written to wrap DGN files, defining a class for each element type, various classes to capture non-graphical and setting data, and a class to define a "DGN Model." Another design file format for which a schema could be written is the Standard for Exchange of Product model data (STEP) format.

Representing element-level information in the form of persistent components is the basis for element-level information sharing. There is no necessity for a one-to-one mapping between elements and components, although a one-to-one mapping will be common. In a file-oriented system, only a file has an identity, so only a file can be moved, changed, or archived. In a ProjectBank, each component in a bank has an identity. It is therefore possible to retrieve, update, and document changes to project information at the component/element level in ProjectBank. Since the schema exactly captures the information in a design file, an equivalent file can always be obtained from its components. This is what enables the use of traditional file-oriented tools as project data editors.

ProjectBank also adds and maintains additional project-, model-, and element-level information, beyond what could be represented in a design file of any format, plus historical data. In addition, a wrapping schema may be extended to support capabilities such as change-merging and verification that go beyond what is required just to capture file format. Embedding design file information in a richer information universe is the basis for how ProjectBank supports better documentation of design changes, validation, merging, and forward-compatibility with new tools. This is discussed further below.

Transactions—Synchronization and Commit

Before an editing session with a file-oriented tool is initiated, an engineer connects to a ProjectBank and requests that it re-create the current version of a design file. That design file is not merely a stand-alone unit, but is tied back to the ProjectBank from which it was produced, and its contents are tied back to the components in the ProjectBank that capture the model's information persistently. This is how ProjectBank supports round-tripping, which is the process of converting design information from one file format to another and back again. The context in which a design file exists as a window on a ProjectBank is called a "transaction" against the ProjectBank. This is explained below.

An engineer uses the appropriate file-oriented tools to edit and/or view the files created in a transaction. If two or more users are editing and/or viewing the project, then each gets his own generated copies of the design files to work on, each derived from a common source bank and tied back to it.

When an editing session is over, the user has the option of posting his changes to the ProjectBank on the network. Until he does that, his changes are reflected only on his local computer. The ability to keep changes local until they are ready is a key feature of the long transaction model and is especially suited for engineering design work.

To prevent one user from inadvertently overwriting another's work, a local version must be "synchronized" before it can be committed. Synchronizing involves comparing a user's edited models to the most recent work available from all other users, and updating the edited models accordingly. If a user starts with an early version of the model and changes it, while meanwhile, another user modifies the model and commits his changes first, then the first user is not synchronized—he must take into account the second user's changes before he can commit his own. If the first user has in fact changed some of the same aspects of the model as the second, then synchronizing will reveal that the two changes are in "conflict." The two users must discuss the conflict and the first user must resolve it by backing off, adapting, or asserting his own work in response. If, in another scenario, the first user had not changed the same aspects of the model, then the second user's changes would not be in conflict. Synchronization in this case would simply cause the first user's copy of the model to absorb and reflect the second user's changes. Once a local version is synchronized, it can be committed, becoming the basis for other users' work Once synchronized, a user can post his changes to the version on the network. This is called "committing" the transaction. Commit updates the official copy of the model that exists in the ProjectBank on the network to reflect changes made locally. To do this, intermediary software on the user's machine compares the local design file with the model and transmits the modified components back to the ProjectBank on the network. Updating the ProjectBank creates a new, official version of the project, which all others can see.

Normally, because teamwork is coordinated, changes made by other members of the team will complement, rather than directly conflict with, a user's work-in-progress. Sometimes, however, conflicts will occur, and these are flagged by the synchronization process. A transaction cannot be committed until conflicts are resolved. The bedrock requirement of collaborative engineering technology is to prevent collisions from resulting in corruption of the project or loss of work. As discussed below, ProjectBank detects conflicts at the component level, so that opportunities for conflicts are minimized and the areas of conflict are precisely identified.

Even if direct conflicts do not occur, changes to surrounding or supporting aspects of the project may put the user's own work-in-progress in a new light. One of the chief aims of collaborative engineering technology is to enable the user to discern relevant changes in the surrounding environment. Since ProjectBank performs updates at the component level, it is possible to highlight the areas of change precisely.

Version Management

The ProjectBank incorporates a version-management system that maintains a history of how components have been changed by transactions. When a commit operation produces a new version of the project, the previous version is first archived, by recording what components were changed in the "journal" (also known as the "history file"). ProjectBank's journaling is based on a common technique in transaction-oriented data management. This also supports a robust fail-safe mechanism. Thus, the ProjectBank can document the history of changes to any component, can restore any version of the project, and can deliver any component as of any historical version on demand, as required by a transaction in progress. The last noted capability is the key to making long transactions expandable.

Details of Operation

One way to implement the ProjectBank technology is to set up a system of one or more clients and one or more servers. At the simplest level, one physical machine could contain both client and server. The file-based data, once componentized, can be stored in separate discrete units, called stores. For example, all of the information corresponding to one design file would reside in a single store. The stores themselves reside on a server and are accessible to only one server. A single server, however, could have access to multiple stores.

A client program, either on the same machine as the server or connected through a network, would have access to the servers. A user wishing to work on an engineering project would start their client program and project. The project would know which components it needed by examining its list of stores. When retrieving the objects for a project, the client will look up the stores needed for the project from the project's store list. The client then determines which server to access from the store's server ID. Then the client can request the needed information from the server. Only the store needs to know to which server it is associated. All access to the data can take place as needed, making the network organization transparent to the user.

FIG. 1 illustrates one view of an exemplary embodiment of a project according to the present invention. A project 106 captures the current state and progress of a change to a set of design files. The projects available on a network of computers are listed and accessed through a project registry 102. The project registry 102 lists each project's definition 104. A project 106 is defined by its globally unique ID 108 and by one or more change control policies 110. A project 106 has other attributes that are not part of its definition. In particular, a project 106 has a project control store (PCS) 112. The PCS 112 is a special store. Like all stores, which are described in more detail below regarding FIG. 3, it has a globally unique ID 118. Unlike other stores, however, the PCS's ID 118 must match the ID 108 of the project it belongs to. The PCS 112 also contains the project revision history 116, which tells what versions of the referenced stores were produced as part of the project. Additionally, the PCS 112 contains the list of stores 114 used by the project. It is important to note that a project does not own the stores that it references. A project has access to its stores through its project control store (which the project does own, in a sense). Additionally, a project has a project directory 120. A project directory contains an entry object 122 for each store needed by that project. Each entry 122 knows the ID of the store that it references. An entry does not point directly to its referenced store, but instead contains enough information about the store that it can look up the store on the network when needed.

Figure 2:
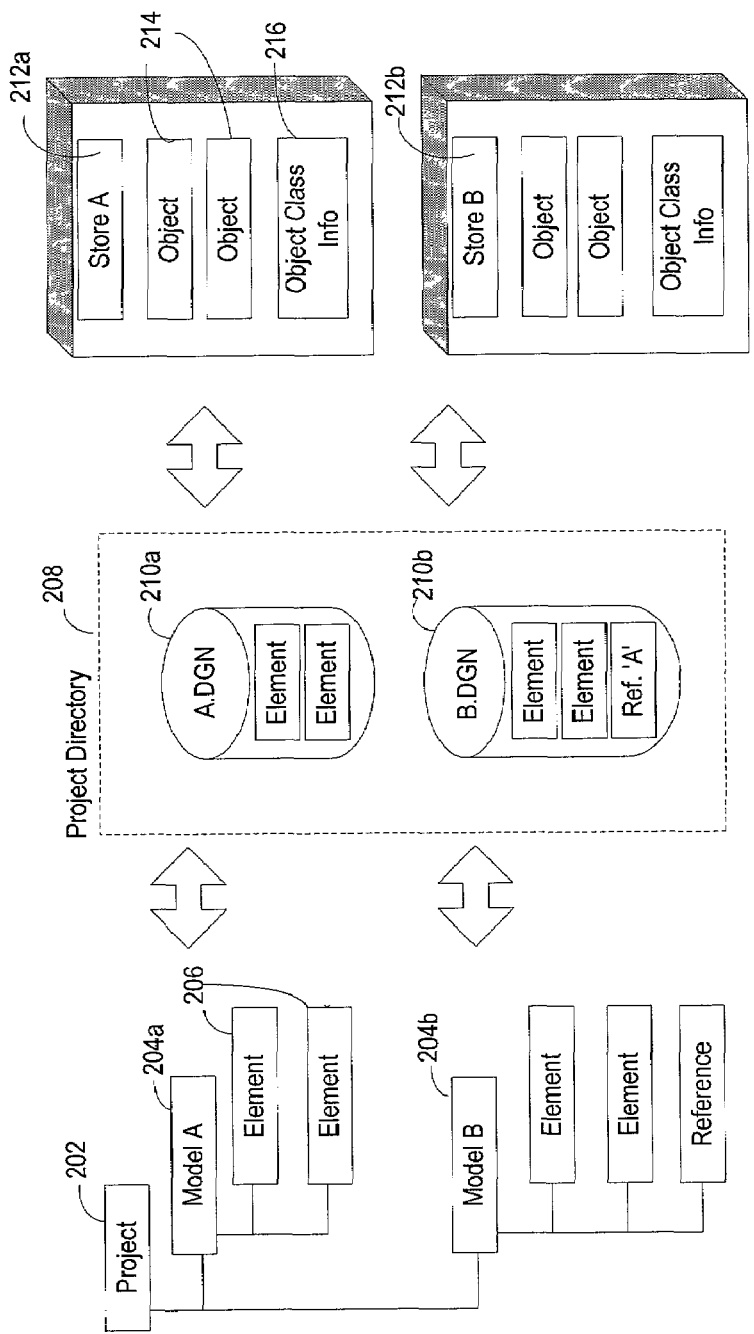
FIG. 2 depicts the relationship between a conventional file-based project and a project according to the present invention.

FIG. 2 shows a logical view of how design files relate to the ProjectBank component model. For example, assume there are two models, "A" and "B," respectively labeled as 204a and 204b. Each model contains design elements 206. Each model corresponds to a separate design (DGN) file 210a, 210b. In one embodiment of the present invention, each logical unit of data corresponding to a design file resides in its own database or store, 212a and 212b. Each element is stored as an object 214 within the store 212. Additionally, a store can contain object class information 216 for each of the objects stored with it.

Figure 3:
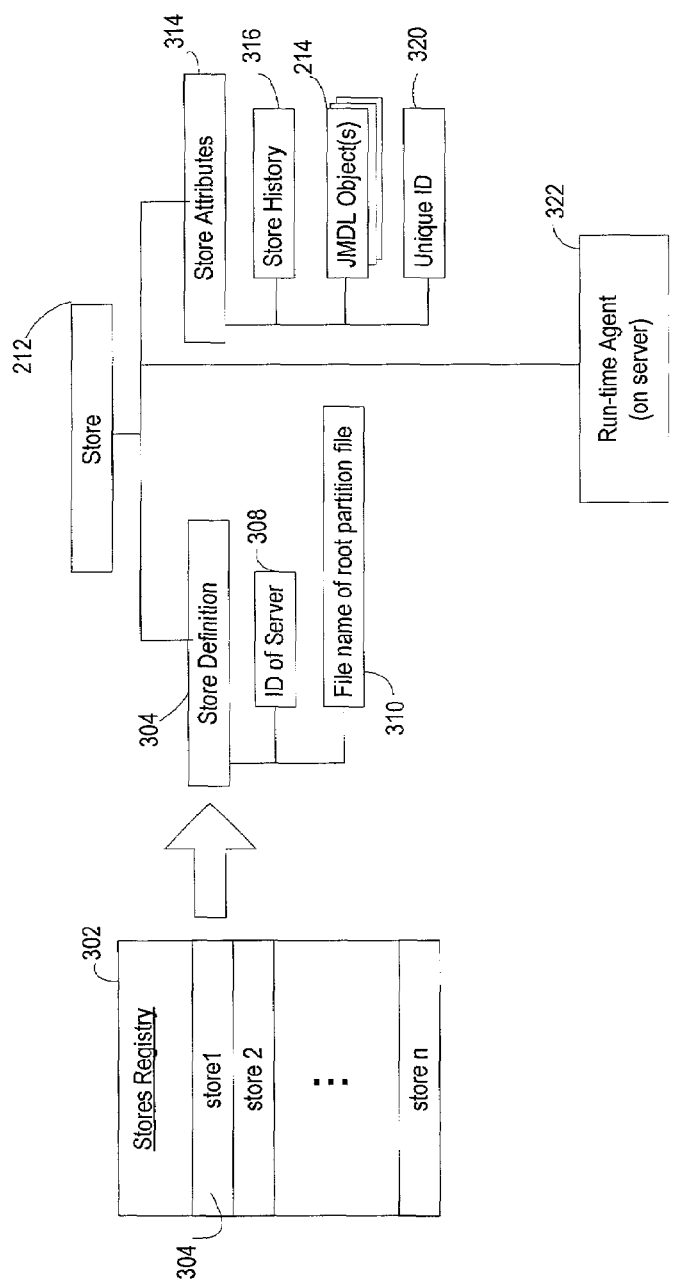
FIG. 3 depicts an exemplary embodiment of a store according to the present invention.

FIG. 3 illustrates one view of an exemplary embodiment of a store according to the present invention. A store is like a file in a filing cabinet. It contains all of the information needed to describe and create the components of a model. In one embodiment of the present invention, a single store contains only the information that would be traditionally represented in one file-based design system file.

A store 212 can be described in terms of its definition 304 and its attributes 314. A store is defined by the ID 308 of the server that accesses the store and by the file name 310 of the root partition file of the store. The store definition is stored under the store's globally unique ID 320 in a stores registry 302, which contains a list of available stores. Servers use the store definitions 304 to determine the location of the store's files. A store is only accessible through the server that it designates in ID 308.

A store has a JMDL object repository 214, which contains model object data. In addition to its JMDL object repository 214, a store has a run-time agent 322 that resides and executes on the server identified by the store's defined server ID 308. Each store has its own history file 316, which catalogs all changes from all clients in order of occurrence made to the objects in the store. This allows the store to be accessed and modified by multiple clients at the same time.

The server to which the store 212 is attached forwards requests for data access from clients to the run-time agent 322. The run-time agent 322 holds the store 212 open for exclusive access by the client. As stated above, a store contains the objects that make up a single persistent model, representing a single design file. A store may also contain objects for multiple models. In addition to containing the objects of a model, a store also manages the classes required by the objects.

Figure 4:
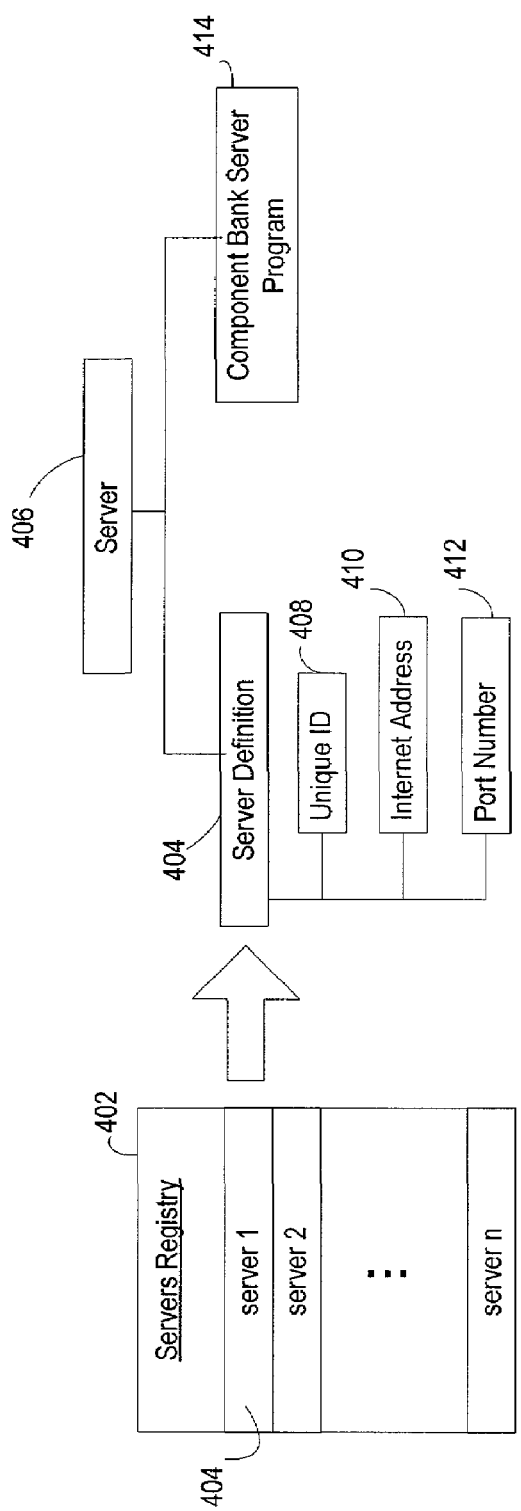
FIG. 4 depicts an exemplary embodiment of a server according to the present invention.

FIG. 4 shows an exemplary embodiment of a ProjectBank server according to the present invention. A server 406 provides controlled access to one or more stores. A server 406 is essentially one instance of a component bank server program 414 executing on a machine such as a personal computer. A server's definition 404 is made up of a globally unique ID 408, an Internet address 410 and a port number 412. The server's definition 404 is stored under the server's ID 408 in a server registry 402, which lists all the available servers. Multiple ProjectBank servers can exist on one physical machine, as long as each has a different port number.

ProjectBank is based on multi-user Component Databanks (CDBs), as described in more detail in the section below entitled "Background on Long Transactions." Each client transaction creates and maintains its own local CDB to serve as a component cache and to buffer uncommitted changes. Since this CDB is unshared and private to a particular client, it is sometimes referred to as the client's "briefcase." The user's briefcase serves as a hub through which the user obtains model data from the one or more servers that are linked to the stores, and transmits changes to the servers. These services are provided by intermediary software running on the client machine called the "briefcase manager". The user does not normally edit the components in his briefcase directly, but such a possibility exists.

Figure 5:
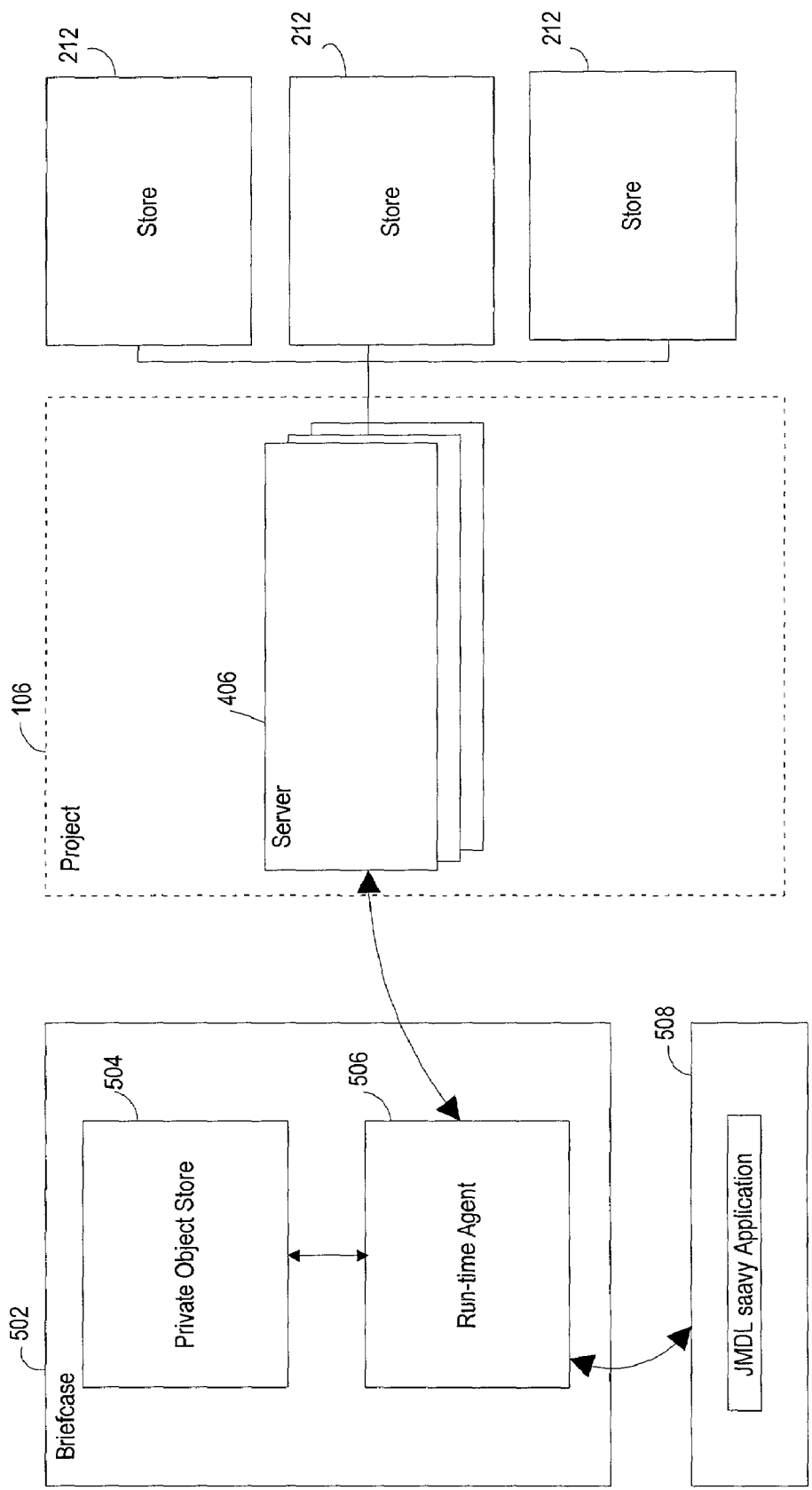
FIG. 5 depicts an exemplary embodiment of the relationship between a briefcase and a project and server according to the present invention.

FIG. 5 depicts an exemplary embodiment of the relationship between a briefcase 502, a project 106 and a server 406 according to the present invention. A briefcase 502 contains both a private object store 504, analogous to a store's object repository, and a run-time agent 506. The briefcase 502 is used by a JMDL application 508, such as, e.g. ProjectBank Explorer, to access the project directory of a project and to access the models contained in the stores 212 referenced by the project. Specifically, the application 508 interacts with the briefcase's run-time agent 506 to obtain local copies of the models that are not already resident in the briefcase's object store 504. If the model is not already resident, the run-time agent 506 looks up the needed store in the store registry to locate the store's server, connects or reconnects to the server 406, requests access to the model objects from the server 406, which forwards the request to the appropriate store 212, and copies the model objects to the briefcase's private store 504. A briefcase can use a single socket connection to communicate with a given server to access the stores associated with that server. In order to connect to a server, a briefcase invokes a method that looks up the server's Internet address and port in the server registry, and then attempts the socket connection.

All communication between the client and the servers is done in terms of components. Most interactions between client and servers involve moving stored component data from one CDB to the other, either from store to server to briefcase when performing synchronization, or from briefcase to server to store when performing a commit. Design files are never moved between client and server. Design files are, instead, artifacts that are created and processed locally by a briefcase manager.

Background on Long Transactions

At any given time, there is only one approved and universally observable copy of a model. This is called the "tip" version. To work on a model, a user makes a virtual copy of it on his computer. The copy is tied to the servers and may be re-synchronized with the tip or merged back into it, as discussed below. Work on a virtual copy of a shared model (a briefcase) is called a "long transaction." Each user executes his own long transaction(s) against the project servers. The long transaction is the basis for concurrency control.

Each virtual copy is isolated from changes made in any other and to changes made to the tip version, so that the model always appears to the user to be in the state that was obtained when he started his long transaction, plus any changes he has made to it himself In other words, the virtual copy appears to the user to be a full local copy of the model.

A user may modify his virtual copy in any way that he likes. If the user creates a new version of the model, it is called his "local version." No other user would see this local version inside a briefcase, so long as the long transaction is executing. A long transaction is expected to last for a significant amount of time, reflecting the nature of engineering design work.

A user may attempt to promote his local version to become the tip version, so that all other users would see it and work on it. This operation is called "committing" the long transaction. Committing essentially replaces the permanent version of the model with the user's copy of it. (As discussed below, only the changed parts of the model need be updated.)

When making changes, a user's goal is to move the model to a new, valid state. The validity of a model can be defined at many levels. At the primitive level, a model is defined by a set of schemas, that is, a set of related classes, which contain data definitions and design rules, among other things. A model is in a valid state if the validation rules of the schemas have been executed to verify and react to the user's direct modifications. The goal of synchronization can be restated as producing a new, valid version of the model, by applying the outside changes to the local version. These outside changes are applied atomically and are validated, just as a local change would be handled.

The process of injecting and validating another user's changes into one's own version is call "merging." While synchronization sometimes reveals direct conflicts and sometimes reveals no overlap at all between one user's work and another user's work, it often entails an attempt to synthesize the work of two or more users. It may be that changes made locally to the model have created a context in which the other user's changes are not workable. Or, it may be that the outside changes will look different in the local version than in the tip version, perhaps because of the way changes "ripple through" relationships and are combined to produce a model's state.

In an exemplary embodiment of the present invention, the ProjectBank technology can be embedded into an existing engineering environment, such as, e.g. Bentley Systems' Viecon™ and ProjectWise™. This allows the use of security and data access features of the engineering environment, such as user validation, in conjunction with the project and configuration management features of ProjectBank.

The distribution of project data to various stores allows greater scalability in project design and structure. If a project outgrows the server on which it resides or if the server is otherwise problematic, the server's stores may be moved, or redeployed, to a different server. Since stores, and therefore servers, are only accessed during a synchronization or commit, such redeployment can occur while clients are on-line with only a temporary and transparent break in the clients' connections. This ability to redeploy while preserving connections is known as location transparency.

Similarly, adding stores to additional servers can scale out a project. Scaling a project out is also transparent to the clients, because the clients do not need to know Where the models and components reside on the network. Only the stores need to know to which server they connect.

Clustering servers could also scale out projects. In clustering, multiple servers are assigned to the same store. One server acts as the true server, interfacing with a briefcase's run-time agent and the server's stores, while the other servers act as clients to the true server.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-implemented method of managing physical-file-based data adapted to be manipulated via a file-based computerized editor, wherein the physical-file-based data includes a physical file having a plurality of file elements, the method comprising the steps of:
   (a) representing the physical-file-based data as a plurality of individual components, each individual component having a unique identity and identifier, wherein said individual components are adapted to be manipulated by a transaction-based computerized editor;
   (b) storing (i) a latest version of the individual components, and (ii) information to fully document changes made to each version of each individual component during each of said plurality of successive sessions, wherein said changes comprise additions, modifications and deletions,
   in a store, wherein all of said individual components corresponding to one physical file of said physical-file-based data are stored in a single store, and said single store contains no individual components of a different physical file of said physical-file-based data; and
   (c) recreating equivalent physical-file-based data for use within an environment of a physical-file-based computerized editor from said individual components in said store and storing said recreated equivalent physical-file-based data, wherein said recreated physical-file-based data is adapted to be edited via a physical-file-based editor in a plurality of successive sessions.

2. The method according to claim 1, further comprising:
   (d) retrieving said components using a client comprising a private store, and a run-time agent, wherein said run-time agent looks up a store's server, connects with said store's server, requests said components from said server, and stores a version of said components in said private store.

3. The method according to claim 2, further comprising:
   (e) providing access to said retrieved components to external applications through said run-time agent.

4. The method according to claim 1, further comprising at least one of:
   (d) using said information stored in step (b) (ii) to view successive versions of any individual changed component; and
   (e) using the information stored in step (b) (ii) to view a plurality of changed components.

5. The method according to claim 1, wherein step (a) includes defining and storing a schema for said plurality of components, said schema being a set of classes that captures all of the information in said physical-file-based data.

6. The method according to claim 5, further comprising the step of:
   (d) retrieving said schema whenever said components are retrieved from said store.

7. The method according to claim 5, wherein said schema defines at least one of a class for each element type, and a plurality of classes for said physical-file-based data.

8. The method according to claim 5, wherein said schema is associated with a type of file selected from the group consisting of a DGN file, a DWG file and a STEP file.

9. The method according to claim 1, wherein each component has (i) a unique identifier, (ii) a set of fields, each field having a data type and a data value, and (iii) a program which interprets and modifies said fields, and step (b) includes storing items (i)–(iii) for each component.

10. The method according to claim 9, wherein at least some of said components further have (iv) a list of other dependent components, and step (b) further includes storing said list for such components.

11. The method according to claim 9, wherein at least some of said components further have (iv) an access control value, and step (b) further includes storing said access control values for such components.

12. The method according to claim 1, wherein step (a) includes mapping at least some of said plurality of elements to respective single components.

13. The method according to claim 1, further comprising:
   (d) defining a tag for at least some of said file elements during interaction with said file-based computerized editor; and
   (e) storing and saving a mapping between said tag for each tagged file element and its component identifier.

14. An apparatus for translating physical-file-based data adapted to be manipulated via a physical-file-based computerized editor into a plurality of individual components, wherein the physical-file-based data includes a physical file having a plurality of file elements, said apparatus comprising:
   (a) a translator that represents physical-file-based data as a plurality of individual components, each individual component having (i) a unique identifier, (ii) a set of fields, each field having a data type and a data value, and (iii) a program which interprets and modifies said fields, wherein said individual components are adapted to be manipulated by a transaction-based computerized editor; and
   (b) a memory for storing (i) a latest version of the individual components, and (ii) information to fully document changes made to each version of each individual component during each of said plurality of successive sessions, wherein said changes comprise additions, modifications and deletions, in a store, wherein all of said individual components corresponding to one physical file of said physical-file-based data are stored in a single store, and said single store contains no individual components of a different physical file of said physical-tile-based data;
   wherein said translator is adapted to recreate equivalent physical-file-based data for use within an environment of a physical-file-based computerized editor from said individual components in said store; wherein said recreated physical-file-based data is adapted to be edited via a physical-file-based editor in a plurality of successive sessions; and said recreated equivalent physical-file-based data is stored in said memory.

15. The apparatus according to claim 14 wherein at least some of said individual components further have (iv) a list of other dependent components, said memory further staring such lists.

16. The apparatus according to claim 14, wherein at least some of said individual components further have (iv) an access control value, said memory further storing such values.

17. The apparatus according to claim 14, wherein each element is represented by a component.

18. The method according to claim 14, further comprising at least one of:

(d) using said information stored in step (b) (ii) to view successive versions of any individual changed component; and (e) using the information stored in step (b) (ii) to view a plurality of changed components.

* * * * *